Feb. 3, 1959  D. K. EADS ET AL  2,872,294
PRODUCTION OF SULFUR FROM PYRITES
Filed May 16, 1952
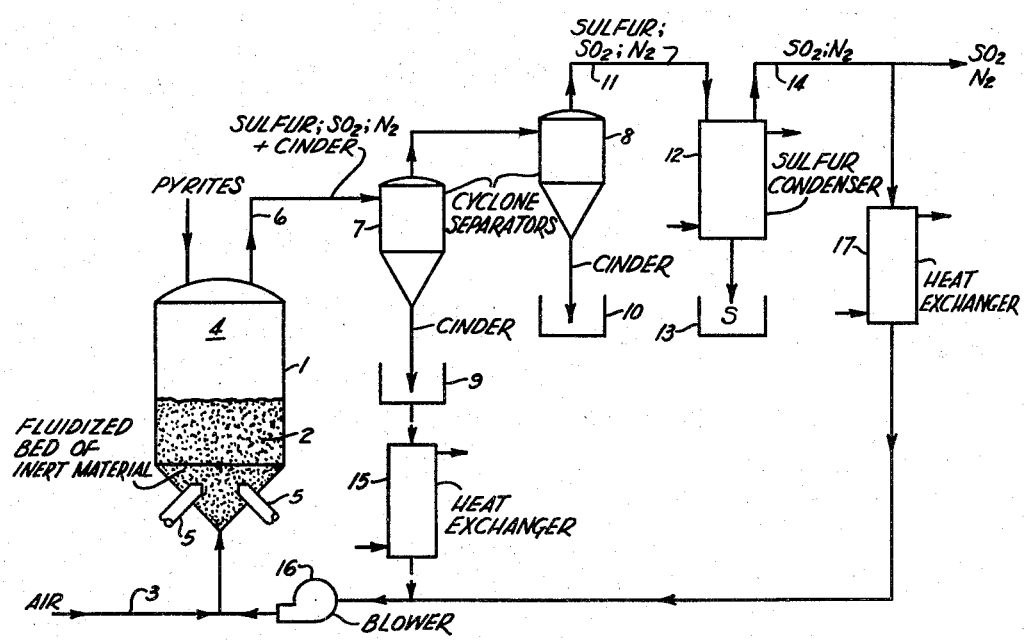
INVENTORS
DAVID K. EADS
GINO P. GIUSTI
BY

2,872,294

PRODUCTION OF SULFUR FROM PYRITES

David K. Eads, Pittsburgh, and Gino P. Giusti, New Kensington, Pa., assignors to Texas Gulf Sulphur Company, New York, N. Y., a corporation of Texas Application May 16, 1952, Serial No. 288,192

4 Claims. (Cl. 23—224)

This invention relates to the roasting of pyritic ores to produce sulfur.

Pyritic ores have been roasted by various procedures. One involves the use of shelf-type equipment, characterized by the Herreshoff roaster, in which the ore moves, under the influence of rakes or rabbles, progressively over a series of vertically arranged shelves. This type of equipment is cumbersome and not satisfactory for this type of roasting due, in part, to the fact that there is a large material hold-up which in turn causes the apparatus to be undesirably slow in responding to changes in operating variables. Such slow response is undesirable and uneconomical for in roasting pyritic ores it is necessary to maintain the solids at a temperature above about 600° C., otherwise oxidation to sulfate occurs which obviously causes a considerable loss of sulfur and contaminates the cinder, or spent oxide. On the other hand, in shelf-type roasters operated above about 900° or 950° C. the cinder tends to fuse and form lumps that cannot be roasted completely because the oxygen for roasting cannot diffuse into the lumps at any appreciable rate. The reaction involved is highly exothermic so that difficulties are readily encountered in adequately controlling the temperature during roasting.

Another mode of roasting pyrites is that known as flash roasting. In this practice the finely ground pyrites is dropped through an upwardly moving stream of air for roasting. Good temperature control and response to operating changes are characteristic of this practice but very large combustion space is necessary to obtain complete oxidation and to keep the gas velocity below the terminal velocity of the falling particles.

More recently it has been proposed to apply the well known fluidization technique to the roasting of pyritic ores. In this practice a current of gas is passed through a bed of finely divided particles at a velocity relative to the particle size and the bed depth such as to cause the bed to act like a boiling liquid with a rather sharply defined upper surface. Ideally this proposal is attractive because of the many advantages of fluidization. Thus, there is excellent temperature control, temperature uniformity and high heat transfer rate in a dense fluidized bed as a result of rapid, complete and uniform mixing. High reaction rates result from the large surface for reaction presented by the small particles and as a result of the continuous motion of the particles. However, in fluidization as heretofore practiced the ore throughput has been severely limited by the fact that, at a specific temperature and with a given ore, there is a gas velocity through the bed above which the entire fluidized bed would be carried out of the reactor. As a consequence of this limit on the gas velocity, and hence on the oxygen available for roasting, the amount of ore which can be roasted is definitely limited, and this limitation becomes increasingly serious as the temperature increases. This has militated, at least in part, against the use of the fluidizing technique for the roasting of pyritic ores despite the fact that the rate of reaction and the temperature may be controlled better than in shelf or flash roasting equipment and the fact that control of the reaction rate may be obtained by varying the feed rate and gas velocity.

A primary object of the present invention is to provide a method of roasting pyritic ores by the fluidization technique that is simple, is easily practiced with standard apparatus, avoids the disadvantages of shelf and flash roasting, that confers the advantages of fluidizing but with the attainment of greatly improved through-put, and is productive of elemental sulfur.

Other objects will be recognized from the following description.

The invention will be described in connection with the accompanying drawing which is a schematic representation of apparatus for the practice of one embodiment of the invention.

The invention is predicated in large part upon our discovery that in the roasting of pyritic ores whose minimum carryover velocity of the roasted cinder is less than that of the raw ore, that the fluidization technique may be applied to increase the through-put substantially, in comparison with standard fluidization practice, by the use of a gas velocity such as to move the cinder out of the fluidized bed with the gaseous products of reaction from the bed but at a velocity such as to cause little or none of the pyrites to move with the gaseous products.

More particularly, in accordance with this invention, pyrites ($FeS_2$) in the form of finely, or relatively finely, divided particles is fed to a fluidized bed of inert material, in a confined space, from which gaseous products of reaction are removed. Either before or after reaching the inert bed, or both, the pyrites particles lose the labile sulfur atom. The ore particles circulate through the bed under the fluidizing action of a current of an oxygen-containing gas, such as air, that not only fluidizes the bed but also supplies oxygen for combustion of the residual sulfur in the pyrites particles with production of sulfur dioxide ($SO_2$) and iron oxide cinder. The stream of oxygen-containing gas, most suitably air, is regulated in such manner as to effect adequate fluidizing of the inert particle bed while at the same time being fed in such amount that the oxygen content will be wholly, or substantially wholly, consumed in converting the residual sulfur of the pyrites feed to $SO_2$, and at such a velocity as to exceed the minimum carry-over velocity of the roasted, or iron oxide, cinder, but below the minimum carry-over velocity of the ore fed to the roaster. The inert material of the fluidized bed is of such particle size and density that substantially none of it will be carried out of the bed by the gaseous products, i. e., its minimum carry-over velocity is equal to or, and preferably, greater than that of the pyrites.

The oxidation, reactions, e. g., of sulfur, iron and iron sulfide, in the fluidized bed is highly exothermic. Consequently, pyrites feed and air feed should be adjusted so that the reaction gases are substantially free from oxygen and provision must also be made to keep the bed temperature below about 950° C., above about which the pyrites tends to fuse.

There can be withdrawn from a single reactor a mixture of sulfur vapor, $SO_2$, $N_2$ and substantially the entirety of the iron oxide cinder. The cinder is separated from the product gases by known means, the sulfur is then condensed and recovered, and the residual $SO_2$ and $N_2$ may be treated according to prevailing economic conditions.

The invention may be explained in further detail with reference to the accompanying drawing. A reactor 1 is provided with a bed 2 of inert material of the character described above and in a form adapted to be fluidized. Air is fed to the bottom of the bed through a conduit 3, and finely divided pyrites is fed by suitable means into the space 4 above the bed 2. Prior to feeding the pyrites to the reactor the bed 2 is brought to an appropriate temperature, suitably about 900° C., for initiating the reactions. This may be done in various ways as by means of gas burners 5, or in other ways that will be evident to those skilled in the art. When the bed is at temperature the burners are cut off and the feed of air and pyrites is started with withdrawal of products through a conduit 6.

In accordance with the invention the velocity and volume of the air stream supplied to bed 2 are correlated (1) to effect fluidization and to effect carry-over of substantially all of the iron oxide cinder but at the same time to keep the velocity below the minimum velocity that will cause carry-over of the ore in its unroasted or partially roasted form, or of the inert bed material, and (2) to supply only enough oxygen to burn the sulfide sulfur from the ore in the bed so that the gases leaving the bed are substantially oxygen free. The liberated sulfur with gaseous products of combustion, $SO_2$, and $N_2$ in the case of air feed, and the cinder leave reactor 1 through conduit 6 and are passed to cyclone separators 7 and 8 in series in which the cinder is separated and withdrawn to suitable receivers 9 and 10. The cinder-free gaseous products are exhausted from cyclone separator 8 through a conduit 11 to a sulfur condenser 12 from which the condensed sulfur passes to an appropriate receiver 13. The gases from condenser 12 leave through a conduit 14. Their further treatment depends upon economic factors such as separation of the sulfur dioxide for recovery as such or for conversion to sulfur trioxide or even to elemental sulfur; this end treatment of the sulfur dioxide constitutes no part of the present invention and therefore requires no detailed description.

The reaction in the bed is highly exothermic, and under some conditions the amount of heat generated in bed 2 may be excessive. The temperature within the fluidized bed may be controlled readily to be not over about 950° C., however, in various ways. Thus, a portion of the cinder, say from receiver 9, may be passed through a heat exchanger 15 to lower its temperature and under the action of a blower 16 introduced into the air fed to the reactor 1. Or, control of temperature within the bed may be accomplished by recycling a portion of the final gaseous reaction products through a heat exchanger 17, under the action of blower 16, similarly to commingle with the air feed. Another alternative mode of controlling reaction temperature would be to inject steam or water into the fluidized bed.

Various inert materials may be used for the fluidized bed. Satisfactory results are to be had, for example, with fire brick of 20 x 60 mesh size. The fluidization technique is sufficiently well known that those working in the art well understand the degree of ore subdivision necessary. By way of example, however, good results are to be had with pyrites passing a 20 mesh screen with the ore largely of minus 60 mesh size, the bulk between 80 and 170 mesh, and with a substantial proportion passing 325 mesh. With ore so subdivided and using fire brick as the inert bed material, air velocities of from about 0.5 to 2.0 feet per second, depending upon the temperature of the bed, are satisfactory. Of course, the more finely divided the ore the more rapid and the more complete is the roasting.

In the embodiment described the hot gaseous products moving upwardly through space 4 may cause evolution of the labile sulfur atom from a greater or lesser portion of the pyrites falling toward the bed 2, with formation of iron sulfide compound of composition between FeS and $FeS_{1.3}$, sometimes designated as pyrrhotite. The pyrites particles and the pyrrhotite particles thus formed enter the bed where the temperature is such as to cause distillation of the labile sulfur atom from the pyrites particles. As the pyrrhotite particles move downwardly through the bed, under the fluidizing action, they encounter the counter-currently moving air stream and the sulfide sulfur undergoes combustion to $SO_2$ with formation of iron oxide cinder particles which are carried upwardly to and leave from the top of the bed in the gaseous products stream. As a result of the combustion of the sulfide sulfur of the pyrrhotite, the oxygen content of the air stream decreases as it rises through the bed so that, in accordance with the invention the sulfur vapor produced is not oxidized, at least to any uneconomical extent, to $SO_2$ in the upper levels of bed 2 or in the space above it.

Although the invention has been described with particular reference to feeding the pyrites to fall through the gaseous products above the fluidized bed, as from the top of the reactor, it will be understood that it may be fed laterally into the reactor near the top level of the bed or into the upper level of the bed itself.

Although the true density of the iron oxide cinder produced is greater than that of pyrites, the bulk density of the cinder is less than that of the raw ore feed. Be that as it may, the invention is predicated, as indicated above, upon the use of an air or other oxygen-supplying stream at a velocity such as to fluidize the bed and effect carry-over in the product gases of the cinder while being below the minimum carry-over velocity of the inert bed material and below that of the pyrites fed to the bed.

The method provided by the invention not only accomplishes thorough roasting of the ore with recovery of part of its sulfur content as such and the rest as $SO_2$, but also results in higher through-put than is attained in ordinary fluidized practice and thus renders the application of fluidization to ore roasting more practical and economical than was previously possible. Moreover, the cinder will have low sulfur content and thus offers use as a valuable byproduct.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. That method of roasting pyrites to produce sulfur comprising feeding finely divided pyrites particles to a heated bed of dense fluidized inert material through which gaseous products of reaction in said bed move at a temperature to liberate the labile sulfur atom from the pyrites particles fed to the bed, passing a stream of oxygen containing gas upwardly into said bed to fluidize it and cause combustion of the residual sulfur in said particles in the bed with production of iron oxide cinder, the amount of said gas being such that substantially all of its oxygen content is consumed in combustion of said residual sulfur, adjusting the velocity of said stream to exceed the minimum carry-over value of said cinder but below the minimum carry-over velocity of the ore feed and of said inert material, whereby substantially all of said cinder moves with the sulfur and the gaseous products of combustion, withdrawing from said space said cinder, sulfur and gaseous products of combustion, separating the cinder from the sulfur and gaseous products, and condensing and recovering the sulfur.

2. That method of roasting pyrites to produce sulfur comprising feeding finely divided pyrites particles to a heated bed of dense fluidized inert material through a confined space above said bed and through which gaseous products of reaction in said bed move at a temperature to liberate at least a portion of the labile sulfur atom from the pyrites particles with formation of pyrrhotite as they move through said space, the pyrites and pyrrhotite particles then reaching and entering said bed where distillation of further labile sulfur occurs, passing a stream of air upwardly into said bed to fluidize it and cause combustion of the residual sulfur in the pyrrhotite particles with production of iron oxide cinder, the amount of air fed being such that substantially all of the oxygen is consumed in combustion of said residual sulfur in the bed, adjusting the velocity of said air stream to exceed the minimum carry-over value of said cinder but below the minimum terminal velocity of the ore fed and of said inert material, whereby substantially all of said cinder moves with the sulfur and the gaseous products of combustion, withdrawing from said space said cinder, sulfur and gaseous products of combustion, separating the cinder from the sulfur and gaseous products, and condensing and recovering the sulfur.

3. A method according to claim 1, said inert material being fire brick.

4. A method according to claim 2, said inert material being fire brick, and said cinder being magnetite.

References Cited in the file of this patent

UNITED STATES PATENTS

| | | |
|---|---|---|
| 1,776,876 | Winkler | Sept. 30, 1930 |
| 1,947,529 | Leese | Feb. 20, 1934 |
| 1,974,886 | Young | Sept. 25, 1934 |
| 2,031,801 | Tyrer | Feb. 25, 1936 |
| 2,128,107 | Tyrer | Aug. 23, 1938 |
| 2,530,630 | Renken | Mar. 21, 1950 |
| 2,563,086 | Vorschoor | Aug. 7, 1951 |
| 2,586,818 | Harms | Feb. 26, 1952 |
| 2,596,580 | McKay et al. | May 13, 1952 |
| 2,637,629 | Lewis | May 5, 1953 |
| 2,638,684 | Jukkola | May 19, 1953 |

FOREIGN PATENTS

| | | |
|---|---|---|
| 935,341 | France | Feb. 2, 1948 |
| 935,357 | France | Feb. 2, 1948 |